United States Patent
Byers

[15] 3,636,978
[45] Jan. 25, 1972

[54] HYDRAULIC PRESSURE FEEDBACK CONTROL VALVE

[72] Inventor: James R. Byers, 3620 Mountain Drive, Brookfield, Wis. 53005

[22] Filed: Aug. 24, 1970

[21] Appl. No.: 66,318

[52] U.S. Cl................137/625.26, 137/625.49, 251/122
[51] Int. Cl................................................F16k 11/07
[58] Field of Search...............137/625.26, 625.2, 504, 596.1, 137/596.2; 188/352

[56] References Cited

UNITED STATES PATENTS

| | | | |
|---|---|---|---|
| 738,026 | 9/1903 | Gill | 137/625.26 |
| 1,063,975 | 6/1913 | King and Weston | 137/625.26 X |
| 2,837,148 | 6/1958 | Jay | 137/625.26 |
| 3,156,258 | 11/1964 | Moody | 137/504 |
| 3,421,542 | 1/1969 | Adams et al. | 137/504 |

Primary Examiner—M. Cary Nelson
Assistant Examiner—Robert J. Miller
Attorney—Wheeler, Wheeler, House & Clemency

[57] ABSTRACT

Disclosed herein is a hydraulic valve with a valve plunger, a metering valve and feedback piston in tandem. A metering valve member has one end fixed to the end of the plunger and a free end supported in a sleeve to guide a valve portion having a variable cross section through a metering orifice to exhaust fluid into a vent passage and vary the pressure at the valve outlet as the valve plunger is moved. Interchangeable metering valve assemblies containing valve members and orifices with different configurations and dimensions afford different metering characteristics, and thus, different output pressure ranges for different valve applications. The feedback piston is freely reciprocal axially of the plunger and has a feedback face exposed to the valve output chamber and another piston face engaging the free end of the metering valve member to provide a counterforce on the plunger and a "feel" of the output pressure to the valve operator.

9 Claims, 5 Drawing Figures

PATENTED JAN 25 1972 3,636,978
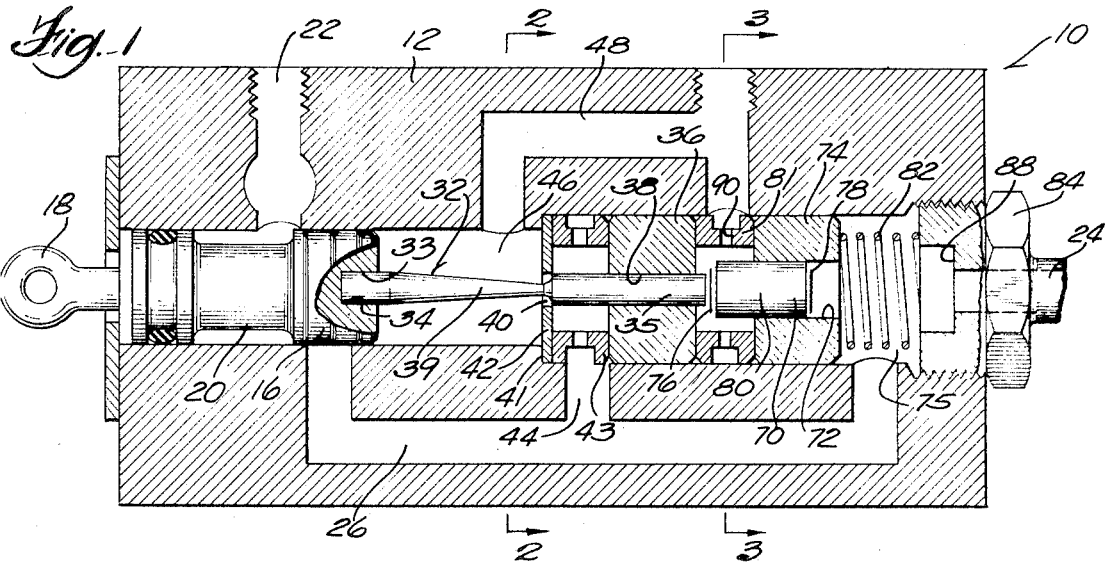
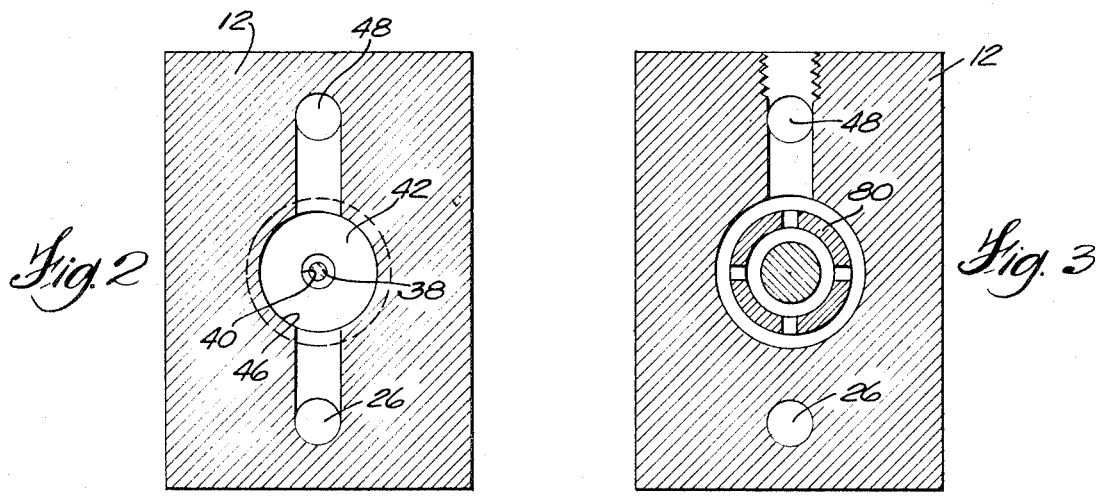
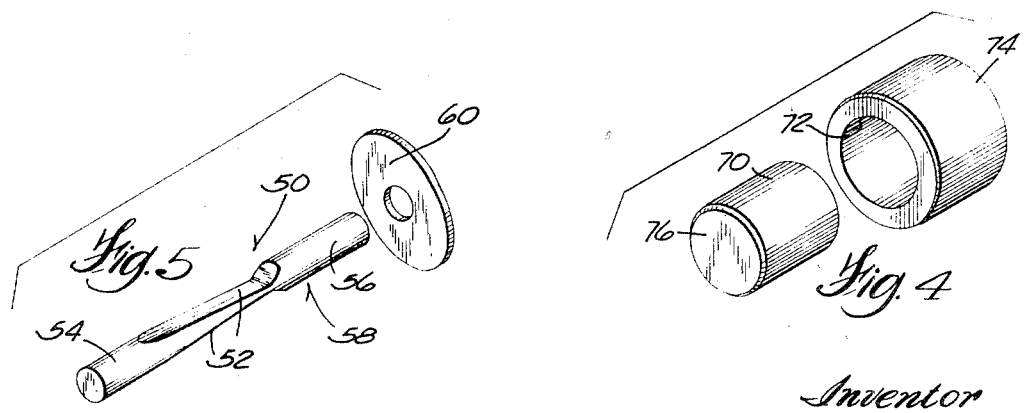
Inventor
James R. Byers
By
Wheeler, Wheeler, House & Clemency
Attorneys 3,636,978

HYDRAULIC PRESSURE FEEDBACK CONTROL VALVE

BACKGROUND OF INVENTION

The invention relates to hydraulic valves and more particularly to valves providing a variable output pressure.

SUMMARY OF INVENTION

The invention provides a hydraulic valve in which flow from the valve inlet to the valve outlet is controlled by axial movement of a plunger or valve spool. The pressure at the valve outlet is controlled by a metering valve in tandem with the plunger. The metering valve controls flow through a branch passage which communicates with a vent passage and includes an orifice and a valve member in the form of a rod with one end of the rod connected to and extending axially of the valve plunger. The free end of the rod is supported and guided for movement in the orifice by an aperture in a guide sleeve. The metering valve member has a variable cross section for a portion of its length which can be in the form of an axially tapered flat or land, located intermediate the ends of the rod. As the valve plunger is moved axially under pressure of the control apparatus, the metering valve moves with the plunger and the land progressively fills the orifice to decrease fluid flow to a vent passage, and thus increase the pressure at the valve outlet.

Insertable pressure cartridges or metering valve assemblies containing metering valve rods of different cross sections and orifices of different diameters readily adapt the valve for various control applications with different pressure requirements.

To provide a "feel" to the valve plunger so that the valve operator can sense the increase and decrease in output pressure upon axial movement of the plunger, the valve includes a feedback piston assembly which provides a hydraulic feedback pressure or counterforce on the valve plunger which is proportional to pressure output. In this regard, a freely reciprocal piston guided in a sleeve adjacent the output chamber has one end exposed to the output chamber and another end which bears against the free end of the metering valve member. As pressure increases in the output chamber as the metering orifice is filled by the valve member, a corresponding increase in pressure on the exposed piston face affords sensing of the changing output pressure by the valve operator.

The feedback pressure is entirely dependent on the area of the piston face and on the hydraulic pressure in the output chamber which is dependent on the position of the valve spool and the metering valve member.

The invention also provides interchangeable feedback cartridges or feedback piston assemblies which are easily inserted in the valve to provide varying feedback forces or pressures on the valve plunger. The feedback piston assemblies contain pistons and guide sleeves of various diameters with piston faces of different areas.

It is an object of the invention to provide a hydraulic valve with variable pressure output in which the pressure variations are controlled by a metering valve having a metering valve member with one end connected to the valve plunger and a free end supported remote from the plunger by a guide sleeve and in which a variable cross section on the metering rod cooperates with an orifice to exhaust fluid to a vent passage.

It is a further object of the invention to provide a hydraulic valve which utilizes a free piston having an exposed face in an output chamber to provide a counterforce on the valve plunger which is transmitted to the plunger by the metering valve member and which force is proportional to the pressure in the output chamber.

Further objects and advantages of the present invention will become apparent from the following disclosure.

DESCRIPTION OF DRAWINGS

FIG. 1 is a vertical sectional view of a hydraulic valve in accordance with the invention.

FIG. 2 is a sectional view taken along Line 2—2 of FIG. 1.

FIG. 3 is a sectional view taken along Line 3—3 of FIG. 1.

FIG. 4 is a perspective view of a modified feedback piston assembly for the hydraulic valve shown in FIG. 1.

FIG. 5 is a perspective view of a further embodiment of the metering valve member.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures.

In the drawings, FIG. 1 discloses a hydraulic valve which is generally designated 10 and which includes a valve body 12 with an axial bore 14 which receives a valve plunger or spool 16. The plunger 16 is provided with an eye 18 and a land 20, and can be connected to any form of input control member or control apparatus. The valve 10 includes an inlet port 22, and outlet port 24 and a first passage 26 which provides fluid communication between the inlet and outlet ports.

In accordance with the invention, means are provided for varying the hydraulic pressure at the outlet 24 in response to axial movement of said plunger 16. In the disclosed construction, the means includes a metering valve member 32 in the form of a cylindrical rod. Means are provided to connect the valve member 32 to the plunger 16. As disclosed, the valve member 32 has an end 33 which is received and anchored in an axis aperture 34 in the plunger. Means are also provided for supporting and guiding the free end 35 of the metering valve member 32. As disclosed, the means comprises a guide sleeve 36 which has an aperture 38 coaxial with the plunger 16.

The valve member 32 has a tapered or frustoconical portion 39 located intermediate the ends 33, 35. Axial movement of the plunger 16 causes movement of the frustoconical portion 39 through an orifice 40 in a plate 42 located against a shoulder 41 and secured by a spacer 43. A second passage or branch passage 44 provides communication between the first passage 26 and the orifice 40. Fluid escaping through the orifice 40 into metering chamber 46 is exhausted to the reservoir through a vent passage 48.

FIG. 5 discloses a modified embodiment of a metering valve member 50. In this embodiment, the valve member 50 has an axially tapered flat or shear land 52 intermediate the ends 54, 56 of a cylindrical rod. The degree of taper and depth of grinding on the properly selected diameter of round can afford various metering valve characteristics for differing valve output pressure requirements.

Metering valve cartridges 58 comprising the valve member 50 and a disc 60 with different tapers or cross sections and orifice diameters are easily inserted in the bore 14 to provide the desired output pressure characteristics.

The invention also provides means for biasing the plunger 16 in opposition to the input force on the plunger with the biasing pressure dependent on the valve output pressure. In the disclosed construction, the means comprises a free piston 70 which is freely reciprocal in an aperture 72 in a guide sleeve 74 and interfits to provide a fluid seal. The guide sleeve 74 is located in an output chamber 75 and coaxial of the plunger 16 and the valve member 32. The piston 70 has a face 76 which engages and bears against the end 35 of the valve member 32.

The other end or face 78 of the piston 70 is exposed to the hydraulic fluid and pressure in the output chamber 75. The counterforce or feedback force is in opposition to the input force on eye 18 and in the direction designated by the arrow 80. The magnitude of the feedback force is a function of the area of face 78 and the pressure in the output chamber. Thus, as the pressure in the output chamber 75 increases as the tapered portion 38 of the valve member 32 fills the orifice 40 and decreases the fluid flow to the vent passage 48 and the pressure in the output chamber 75 increases, the feedback force also increases to provide a "feel" of the increased pressure to the valve operator.

The guide sleeve 74 is secured against a spacer 81 by a spring 82 located between the spacer 81 and a threaded adapter 84 which has a counterbore 86 with a shoulder 88 which serves as a stop for piston 70.

Leakage around the end 35 of valve member 32 and between the piston 70 and the guide sleeve 74 escapes into passage 48 through an aperture 90 in spacer 81.

In operation of the valve, fluid output commences as the plunger 16 is moved from the FIG. 1 position to register the land 20 with the inlet port 22. Initially, the output pressure and thus the feedback pressure will be at a minimum because of maximum flow through the metering orifice 40. The metering valve characteristics can be predetermined to provide a linear or nonlinear output pressure variation with axial movement of the plunger. The feedback pressure can also be predetermined to afford a linear or nonlinear increase in feedback force. In addition, the axial position of the plunger can be calibrated to afford a visual indication of pressure output.

The valve of the invention may be constructed in the various configurations known to the art including: closed center, open center, pressure-compensated, parallel, series-stackable, nonstackable, with or without high-pressure carry over, manual-operated, cam-operated, pilot-operated, solenoid-controlled, servo-controlled, micrometer-controlled, rotary servo-controlled air-controlled, radio-controlled, and single or multiple detented.

What is claimed is:

1. A hydraulic valve comprising a valve body having an axial bore, plunger reciprocally received in said bore, said body having an inlet port and an outlet port, a first passage connecting said inlet port to said outlet port, means defining a metering chamber in said body, a vent passage communicating with said metering chamber, means defining a metering orifice in said metering chamber, a second passage affording communication between said first passage and said metering chamber, a metering valve member having a portion with a variable cross section movable in said orifice, means for supporting and guiding one end of said metering valve member and means connecting said metering valve member of said plunger to afford movement of said valve member in said orifice in response to movement of said plunger to vary output pressure at said outlet port.

2. A hydraulic valve in accordance with claim 1 wherein said means for supporting and guiding one end of said metering valve member comprises a guide sleeve having an axial aperture which freely receives said one end of said metering valve member and interfits with said one end to provide a fluid seal between said valve member and said sleeve.

3. A hydraulic valve in accordance with claim 1 wherein said metering valve member is cylindrical and said variable cross section of said metering valve member is in the form of axially tapered flat.

4. A hydraulic valve in accordance with claim 1 wherein said metering valve member has a frustoconical portion intermediate two cylindrical portions.

5. A hydraulic valve in accordance with claim 1 including a free piston, means for supporting said free piston in said valve body for axial movement, said free piston having one end exposed to said first passage adjacent said outlet port and another end engaging said metering valve member to transmit a counter force from said piston to said plunger in a direction opposite to the input force on said plunger.

6. A hydraulic valve in accordance with claim 5 wherein said means for supporting said free piston comprises a guide sleeve having an axial aperture with said piston freely slidable therein and interfitting in said aperture to provide a fluid seal, a spacer in said valve body and a spring biasing said sleeve against said spacer.

7. A hydraulic valve in accordance with claim 6 wherein said valve body has an output chamber communicating with said first passage, an adapter threadably received in said valve body and having an aperture defining said valve outlet, said outlet communicating with said output chamber, a counterbore in said adapter providing a stop for said piston and wherein said spring is arranged around the path of travel of said piston to permit movement of said piston within the interior of said spring.

8. A hydraulic valve comprising a valve body having a bore, a valve inlet and a valve outlet, a first passage connecting said inlet and outlet, a plunger reciprocally received in said bore for controlling flow through said first passage from said inlet to said outlet, a metering chamber, a second passage communicating with said first passage and said metering chamber, a metering valve assembly including means defining an orifice and a metering valve member located axially of said plunger and movable with said plunger, said valve member having a portion with a variable cross section receivable in said orifice, a vent passage communicating with said metering chamber, a free piston located in tandem with said metering valve member and having one end engaging said metering valve member and another end exposed to said first passage downstream from said second passage so that fluid pressure on said exposed end causes a counterforce on said piston which is transmitted to said plunger by said metering valve member and which opposes the input force on the plunger.

9. A hydraulic valve comprising a valve body having an axial bore, a plunger reciprocally received in said bore, said valve body having an inlet port and an outlet port, a first passage connecting said inlet port and said outlet port, a metering chamber in said body, a vent passage communicating with said metering chamber and adapted to communicated with a reservoir, an orifice for permitting fluid flow into said metering chamber, a second passage connecting said first passage to said metering chamber, a valve member having a free end and one end connected to said plunger and reciprocally received in said orifice to control fluid flow through said orifice and into said metering chamber, a first guide sleeve in said valve body for supporting the free end of said valve member and permitting movement of said free end axially of said guide sleeve, an output chamber in said body in communication with said first passage, a second guide sleeve, a spacer located between and separating said first and second guide sleeves, said spacer having an interior which receives the free end of said valve member, a free piston reciprocal in said second guide sleeve and having one end exposed to said output chamber and the other end engaging the free end of said valve member.

* * * * *